(12) United States Patent
Moran (10) Patent No.: US 9,541,817 B2
(45) Date of Patent: Jan. 10, 2017

(54) DEVICE AND METHOD FOR THE TRANSFER OF PATTERNS TO AN OBJECT

(71) Applicant: Sean Thomas Moran, Corvallis, OR (US)

(72) Inventor: Sean Thomas Moran, Corvallis, OR (US)

(73) Assignee: MIDEA DEVELOPMENT, LLC, Corvallis, OR (US)

( * ) Notice: Subject to any disclaimer, the term of this patent is extended or adjusted under 35 U.S.C. 154(b) by 68 days.

(21) Appl. No.: 14/634,874

(22) Filed: Mar. 1, 2015

(65) Prior Publication Data

US 2016/0252803 A1   Sep. 1, 2016

(51) Int. Cl.
G03B 21/14       (2006.01)
G03B 21/00       (2006.01)

(52) U.S. Cl.
CPC ........... *G03B 21/145* (2013.01); *G03B 21/001* (2013.01)

(58) Field of Classification Search
CPC ......... G03B 21/10; G03B 21/62; G03B 21/56; G03B 21/145; G03B 21/2033
See application file for complete search history.

(56) References Cited

U.S. PATENT DOCUMENTS

| 4,828,114 | A | 5/1989 | Bardeen |
| 5,497,207 | A | 3/1996 | Kim |
| 5,541,680 | A | 7/1996 | Fromm |
| 6,055,738 | A | 5/2000 | Bardeen |
| 6,093,446 | A | 7/2000 | Bardeen |
| 6,267,036 | B1 | 7/2001 | Lani |
| 6,342,175 | B1 | 1/2002 | Brown |
| 6,439,723 | B1 | 8/2002 | Tano |
| 6,497,046 | B1 | 12/2002 | Bardeen |
| 9,158,189 | B2 * | 10/2015 | Joseph ................. G03B 21/604 |
| 2004/0035744 | A1 | 2/2004 | Brown |
| 2005/0017924 | A1 * | 1/2005 | Utt .......................... G09G 3/003 345/32 |
| 2006/0110583 | A1 | 5/2006 | Jackson |
| 2006/0291237 | A1 * | 12/2006 | Richmond ............. A47G 33/08 362/564 |
| 2008/0084542 | A1 * | 4/2008 | Lalley ................... G03B 21/56 353/10 |
| 2008/0207083 | A1 * | 8/2008 | Schnuckle ............. A63H 27/10 446/220 |
| 2010/0296066 | A1 * | 11/2010 | Ou Yang ................ F21V 14/06 353/119 |

* cited by examiner

*Primary Examiner* — Sultan Chowdhury

(57) ABSTRACT

An apparatus for the transfer of patterns to an object. A method for the installation and use of such an apparatus is also included. Apparatus is especially useful in the transfer of patterns for carving and decorative display of lanterns created from pumpkins and other gourds and melons.

3 Claims, 4 Drawing Sheets

DEVICE AND METHOD FOR THE TRANSFER OF PATTERNS TO AN OBJECT

BACKGROUND OF THE INVENTION

The transfer of patterns to objects is common and useful in various industries for a multitude of purposes. Examples include, but are not limited to labels, stencils, printing, and arts and crafts. The present invention relates to the field of pumpkin decoration for the fall holiday season. The invention is specifically useful for the quick and accurate transfer of patterns to a melon, or gourd that is to be carved to create a lantern.

Jack-o-lanterns have been carved from turnips and gourds for hundreds of years, but the practice did not become popular in North America until the late 1800's. Since that time jack-o-lanterns have become an icon to the fall season and the Halloween holiday. Jack-o-lanterns are typically placed on ground level surfaces or on raised items or structures such as benches, chairs, tables, and display stands or other surfaces.

Much innovation has occurred in the past twenty years in the field of pumpkin carving and displaying, but very little innovation has occurred in the field of jack-o-lantern carving pattern transfer technologies. Recent inventions even allow jack-o-lanterns to be suspended from overhanging locations with suspension cable equipment (Moran, U.S. Pat. No. 7,523,910), which also enables viewing of carved pumpkin from all sides. The current state of technology has been driven by the growing popularity of the Halloween holiday, where artistic individuals creatively carve pumpkins, using printed patterns that are laboriously transferred to pumpkins Few industry incumbents provide products for carving pumpkins, and also provide the majority of pumpkin carving patterns to consumers. These incumbents primarily include Pumpkin Masters™ and Funworld™. Some small companies provide pumpkin carving patterns as the sole product to customers, where more innovative and intricate patterns are provided. The primary incumbent for the pattern-only business approach is Zombie Pumpkins™. No currently marketed technologies enable a user to transfer highly intricate patterns to a pumpkin for carving without uncommon skill and significant time investment.

The predominant method for the transfer of carving patterns to pumpkins is through the application of a printed pattern onto a pumpkin. Patterns are printed onto paper or specialized film, then temporarily attached to a pumpkin. The decorator then typically pokes hundreds or thousands of small holes along the lines of the pattern, through the pattern, and into the pumpkin. The pattern sheet is then removed and the pumpkin is carved along the poked holes, typically with specialized yet common carving tools. The current state of the art is very time consuming, prone to mistakes, and difficult due to a placement of a sheet pattern onto a curved pumpkin surface. The flat pattern sheet must be folded and creased in order to approximate the shape of the generally spherical shape of the pumpkin, which further complicates the transfer process, and often-important elements of the pattern are lost in the creases. Finally, users of printed patterns often become lost during carving along the transferred pattern. It is not obvious what the final carved pattern will look like, and therefore no guidance is offered other than strict adherence to the transferred poked holes of the pattern. Other technologies include chemical film methods for transferring patterns to pumpkins (Bardeen, U.S. Pat. No. 6,093,446). This is another form of a printed pattern that is transferred to a pumpkin, and is not a marked improvement over other current methods. Printed stencils have also been used (Bardeen, U.S. Pat. No. 6,055,738), which attempt to mitigate the problem of very time consuming transfer of patterns. Other inventions directly transfer a pattern and remove sections of the pumpkin by punching a pattern (Brown U.S. Pat. No. 6,342,175) in a similar manner as a cookie cutter. Others have developed patterns that have many poking mechanisms built into the pattern sheet (Lani, U.S. Pat. No. 6,267,036) that can be pressed through the pumpkin. Many inventors have developed similar methods and means for transferring patterns to pumpkins, yet none of these solve the problems stated herein. The technologies in the state of the art destroy the pattern materials and are not reusable. Finally, the present technologies are not adjustable in size, as the patterns are of set size. Users may find it very difficult to increase or decrease the size of a pattern in order to accommodate a smaller or larger pumpkin.

There is need for an invention that will allow any person of average skill to quickly and accurately transfer intricate patterns onto a pumpkin in very little time, while also creating an obvious objective pattern transfer that minimizes mistakes, and is also reusable. It is a further need for an invention that enables the user to select the size of the image to be transferred in order to accommodate larger or smaller objects. It is finally a need of the present field to allow a pattern to be quickly changed at any time during the pattern selection and transfer process without additional setup, or loss of time and effort.

BRIEF SUMMARY OF THE INVENTION

The present invention overcomes all of the problems of the prior art, and is superior to the combined functionality of present and past technologies. The unique nature and features of the present invention also enable additional benefits over the state of the arts, as disclosed herein.

The primary object of the present invention is to allow for a user of average skill to quickly and accurately transfer an intricate pattern to a gourd or melon, which will then be uses as a template for carving the object into a lantern. Patterns can be transferred to any object, but the primary purpose of the present invention is the transfer of carving patterns to pumpkins and other gourds, and melons such as honeydew, cantaloupe and watermelons. Nearly any carving pattern could be transferred, including very intricate patterns. The transfer of patterns is possible for any individual with even basic abilities for carving and art, and allows an individual to create a lantern display that may well exceeds their natural abilities, without the use of the present invention.

One additional object of the present invention is to allow for the quick replacement of one pattern for another pattern at any time during the pattern transfer process without additional setup.

An important object of the present invention is that the user be provided a visually accurate projection on the object that will approximate how the final object will appear after transfer, carving and removal of carves elements from the object.

It is another object of the present invention to allow for the size and orientation of the pattern to be adjusted in order to accommodate various sizes of objects for which pattern transfer will be completed.

An additional object of the present invention is to provide a method of use, which requires only the use of hands and simple common tools already utilized in the state of the art, such as hands, marking utensils, and carving utensils, while allowing a person of average skill to transfer even difficult professional carving patterns. The method of the present invention overcomes the problems of the state of the art, including mistakes, significant time requirements, and difficulty.

It is a further object of the present invention to enable the relative positioning of the pattern onto the object in order to create a very accurate transfer with very little effort for any person of average skill.

A distinct advantage to the user of the present invention is that the projected pattern creates additional benefits over any other technology. The projected patterns subject of the present invention will generally appear as the final carved pumpkin, making it very easy to select patterns, and accurately transfer them. Additional functionality includes more detailed patterns showing primary and second operations, such as peeling the outer skin away for a variety of new lighting affects. The present invention will allow pumpkin carvers of average ability to create impressive pumpkin carvings similar to those that professional pumpkin carvers create, such as Villafane Studios™, and others.

Additional objects of the invention are to have attributes including low cost, small size (ease of packaging, storage, and portability), easy of use, lightweight, reusable, and safe to use.

The present invention is an easy to use apparatus provided for the simple, quick and accurate transfer of patterns to objects, such gourds, melons, or synthetic pumpkins. The apparatus is comprised of a miniature image projector (projector), and a projector positioner. The projector is comprised of typical elements of the current state of the art with a specific custom design, and innovative functional elements that help to enable the present invention. The projector includes a housing, lens, light source, battery power source, switch, and projection slide. Similar custom image projectors can be found in children's toys, multi-functional candy toys and flashlight products. The present invention includes a projector where the switch powers a light source, projecting light across the projection slide and through a lens. The lens of the projector is designed such that the focal length and shape will project the pattern on the projection slide onto the object, with sharpness and clarity, of a predetermined sized at a specific distance. This allows the size of the projected pattern to be easily increased or reduced as projected onto the object by increasing or decreasing the relative distance of the projector from the object. The lens is specifically designed to meet the desired specification, but could be comprised of a multitude of designs and materials, including convex or concave designs. Technologies presently available use an image filter placed over the end of a flashlight to project an image. These images are blurry and are not of sufficient sharpness or clarity to meet the need solved by the present invention. The projector may have a specific feature allowing for easy replacement of the projection slide from outside of the housing, into the projector. The user can quickly choose the desired pattern and place it into the projector housing at the proper location. The materials of construction and methods of manufacture are common to the industry. The housing would typically be made of injection molded plastic. The lens is manufactured of plastic or glass material, as is common lens manufacture. The light source is typically a high-output light emitting diode, and the power source is typically a button cell battery configuration to meeting the proper voltage for the lighting source. The switching mechanism is comprised of common types, allowing the user to choose when the light source is on or off with a single actuation.

Image projectors are used in a multitude of industries for various purposes. Applications include projected entertainment media, such as movies. Artists and teachers use overhead projectors (Kim, U.S. Pat. No. 5,497,207) to project images. Teachers display lessons and writing, and artists project images onto art media such as canvases. Slide projectors (Fromm, U.S. Pat. No. 5,541,680) are often used to project images for larger viewing. Miniature electronic projectors are now also available in the state of the art. Projectors are generally very expensive and not specifically designed to project images in the proper size, and location, for solving the problems disclosed in this patent present disclosed problems. These projectors are not adequately portable, or adapted, to meet the needs of the present field. The patent literature and prior art for projection technologies and methods are well developed. The image projector of the present invention is specifically adapted to meet the disclosed objectives, including small size, inexpensiveness, and ease of use, safety, portability, and reusability.

The projector has means of connection to a projector positioner. The projector positioner has multiple functions, and has a proximal and distal end. The first function is to enable stable relative position between the projector and the object. If the user moves the object, while the present invention is connected to the object, the image will retain its relative position on the object. The second function is to enable the ability to adjust the axial rotational position of the projector compared to the object. The third function is to allow the user to increase or decrease the size of the projected image on the object by allowing the user to position the project closer to, or farther away from the object. The fourth function is to allow the fine relative positional adjustment of the projected image onto the object. Once the user chooses the relative position (distance, rotation, location) of the projected image, the transfer of the pattern can begin. The pattern transfer can occur by any method that is the current state of the art for artistic transfer such as cutting, tracing with a writing utensil, or poking many holes as is presently performed in pumpkin carving pattern transfer methods. The projector positioner may be embodied in any number of forms or materials. This could include, but it not limited to, plastic or metal rods. The cross-sectional shape of the projector position is less important the design than the long aspect ratio, but may take various forms. The cross-sectional shape will be either a circle, tube, or multi-pronged (such as a star shape) with the preferred embodiment. This will be discussed in greater detail in the detailed description of the invention. The projector positioner is typically rigid and functionally negates the relative motion between the projector and the object.

The connection between the projector and the projector positioner is a critical feature of the present invention, but can be accomplished in any number of common industry forms. Means of connection include a recessed feature that would accept the opposing shape of the proximal end of the projector positioner, or other means such as a clip, or cradle. The primary requirement of the connection means is to hold the projector and the positioner securely, and temporarily, in place during pattern transfer to the object. Preferably, the mating of the receiving feature and the end of the projector positioner create a tight, but smooth interference to allow adjustability in the rotational position of the projected pattern compared to the proximal end of the projector position. This is a simple matter of thoughtful design, and is not difficult to obtain with common manufacturing methods.

The preferred embodiment of the present invention is a miniature image projector, and a simple rod of circular or multi-pronged (star-shaped) cross-section for the projector positioner, where the projector housing has a receptacle for the proximal end of the projector positioner. The multi-pronged cross-section minimizes the opening in the object created by the insertion of the projector positioner into the object. In the case of a gourd, the multi-pronged projector positioner cross-section will close after removal due to natural processes within the gourd microbiology. This preferred embodiment is especially useful for the transfer of pumpkin carving patterns onto a pumpkin, gourd, melon, or synthetic object. The user connects the projector and proximal end of the projector positioner together, turns on the projector, selects the image location on the pumpkin, and then forces the distal end of the projector positioner into the pumpkin. The user then selects the final relative position of the projector to the pumpkin by rotating the positioner, or pushing the projector positioner further into the pumpkin. Pushing the distal end of the projector positioner further into the pumpkin will decrease the relative distance between the pumpkin and projector, and therefore will reduce the size of the projected image on the pumpkin. Rotating the projector positioner will directly rotate the projected image onto the surface of the pumpkin. Rotating the relative position between the projector and the proximal end of the projector positioner (non-axial rotation) at the connection location will translate the projected image on the pumpkin for fine adjustment of the projected image onto the pumpkin. The design allows for six degrees of spatial relative freedom prior to penetration of the projector positioner into the pumpkin, and three degrees of relative spatial freedom after poking the projector positioner into the pumpkin, which allows for minor final adjustments of the projected image onto the pumpkin. Once the user selects the desired size, orientation, and position, of the projected image on the pumpkin, he will transfer the image to the pumpkin by any number of means, subject of the state of the art. Transfer means include ink pens, and the poking of small holes, or scraping with a sharp object, along the paths of the lines in the projected image. Once the pattern is transferred to the pumpkin, the user removes the projector and projector positioner, and uses common pumpkin carving tools to carve along the lines of the transferred patterns. The present invention and disclosed method of pattern transfer dramatically reduces the time required to transfer patters, while also enabling a user of average ability to transfer intricate and difficult patterns accurately. A wide range of benefits disclosed provides a superior invention as compared to the state of the art.

The present invention enables new capabilities to the industry. Projection slides are very small, where more than one hundred patterns may be printed on a single standard sheet of film. The patterns are then cut with a die to singulate the patterns for mass packaging. This reduces the size of packaging and enables reusable patterns. Printing of patterns on transparent film enables the pattern designer to show distinct pattern types and instructions as part of the pattern. The projected patterns appear very similar to the final appearance of the pattern after carving, reducing confusion to the user, and enhancing the experience. Lighted sections projected onto the pumpkin will be lighted once those elements are removed from the pumpkin, and a light is placed inside of the pumpkin. Many carving artists do not fully remove sections of the carved pumpkin, put only scrape away sections of the pumpkin skin, which creates interesting lighting performance. Projected patterns allow the user to easily mark the sections of skin to be removed. The preferred pattern transfer method is where the user simply traces along the lighted pattern features with pen, which a person of average ability can accomplish, including children. The functions, claims and relevance of the present invention to the current state-of-the-art will be defined in greater detail in the following detailed description of the preferred embodiment in conjunction with the provided drawings.

DETAILED DESCRIPTION OF THE INVENTION

Figure 1:
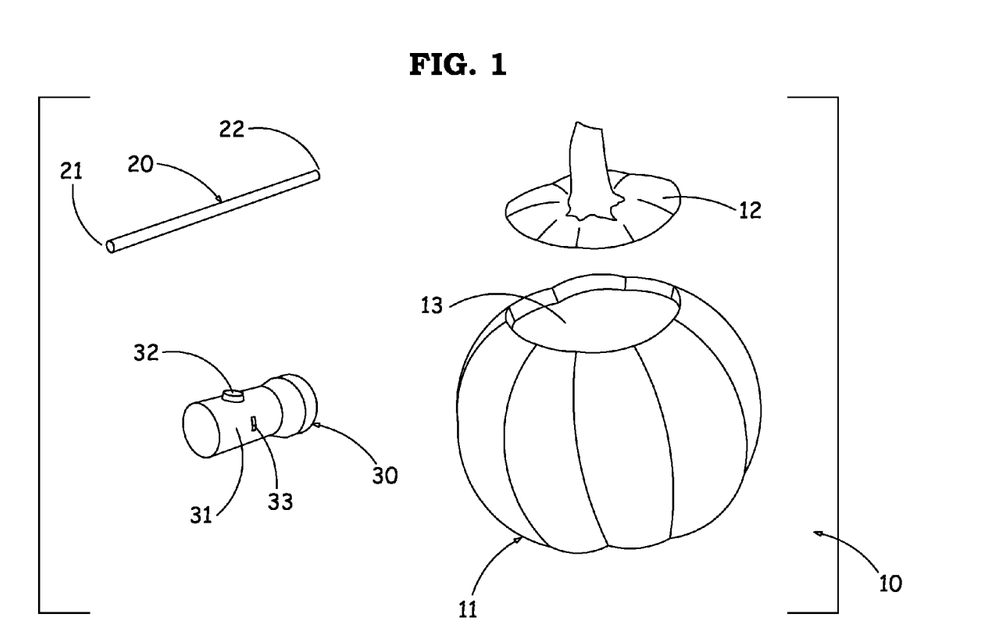
FIG. 1 is a perspective view of the preferred embodiment configuration of the present invention, including a prepared object, projector, and projector positioner as separate items prior to use.
Figure 2:
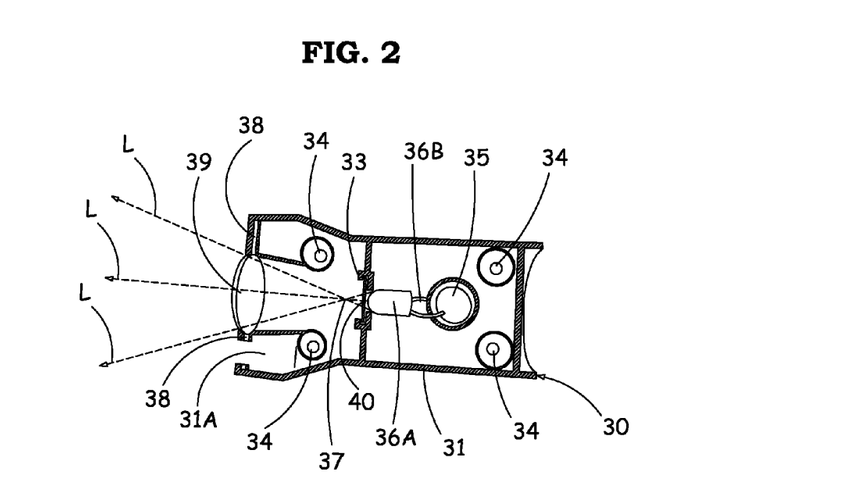
FIG. 2 is a cross-sectional view of the projector, showing the functional elements of the preferred embodiment.

The present invention relates to an apparatus adapted for the quick, easy, and accurate transfer of patterns to any object. The invention is especially useful in the transfer of patterns onto objects for carving those patterns into pumpkins and other gourds, melons such as honeydew, cantaloupe and watermelons, and synthetic foam or plastic objects. The invention is installed by positioning said apparatus relative to the surface of said object by the disclosed method, which projects the pattern to the object with a desired size, orientation, and position. The user then transfers the projected pattern to the object with common means of transfer. One specific requirement of the present invention (required to meet the disclosed needs) is that the image be projected onto the object with sufficient image quality and sharpness in order to provide accurate details for the user to transfer. Once the user transfers the pattern, the apparatus is removed from the object and the user carves features from the object following the transferred pattern. FIG. 1 shows the invention in its entirety 10. Thus, as shown in FIG. 1, a object 11 is prepared for carving by creating an opening 13, and a removed access section, or lid 12, then cleaning the inside of organic materials, leaving only a shell for carving of a jack-o-lantern. FIG. 1 also illustrates a miniature image projector 30, or projector 30, and a projector positioner 20. The projector 30 is designed to project a selected image onto the object 11 in the desired location, with a desired size and orientation, which will then be transferred. The projector 30 and projector positioner 20 have means of temporary and stable connection at the proximal end of the projector positioner 21, to the projector housing 31. Once the projector 30 and projector positioner 20 are connected, the distal end of the projector positioner 22 is penetrated through the outer shell of the object 11 in the location desired by the user. The user activates the projector 30 by means of a switch 32. The projector may also have a projection slide slot 33 for the insertion of projection slide 40, as shown in FIG. 2, which is discussed in greater detail in other figures.

Figure 8A:
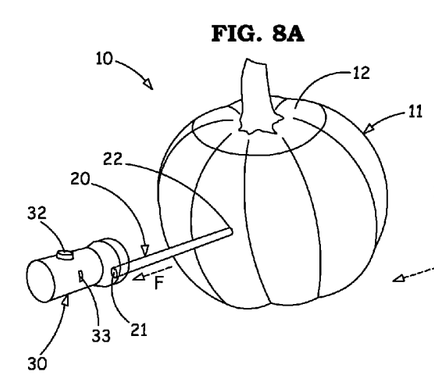
FIG. 8A is a perspective view of the first step of the method of use, specifically showing the connection of the projector to the proximal end of the projector positioner.

The projector 30 is custom designed to generate specific projected image sizes at specific distances, within the design length of the projector positioner 20. This design enables the user to choose the location, orientation, and size of the pattern in the desired location on the object 11. FIG. 2 illustrates a cross-sectional view of the projector 30. The projector housing 31 provides the structural framework for all other components, and means of connection to the proximal end of the projector positioner 21. The projector housing 31 provides structural support for the switch 32, batteries 35, light source 36A, projector slide 40, and lens 39. One or more fastening features 34 may be provided in the projector housing 31 to connect molded halves of the projector housing 31, if necessary by the chosen manufacturing process, such as injection molding. Multi-part housings could also be fasted by glue, or snap-fit features as is common in the connection of injected molded plastic parts. The projector housing 31 also enables the integration of a projection slide slot 33, which is used to create a cradling location for the projection slide 40 from outside of the assembled projector 30. This allows a user to easily remove and replace the projection slide 40 at any time, but also to place the projection slide 40 into the proper location required by the design of the projector 30. The light source 36A is most likely comprised of a high-output light-emitting diode, which has metallic leads 36B that are connected to the battery 35 by the switch 32. The projector housing 31 further includes a lens support 38, which holds the lens 39 in the proper relative position to meet the optical design requirements. Projected light L passing through the lens 39, as shown in FIG. 2, terminates on the surface of the object 11, as shown in FIG. 8C, creating a projection image P, as shown in FIG. 8C.

Figure 8B:
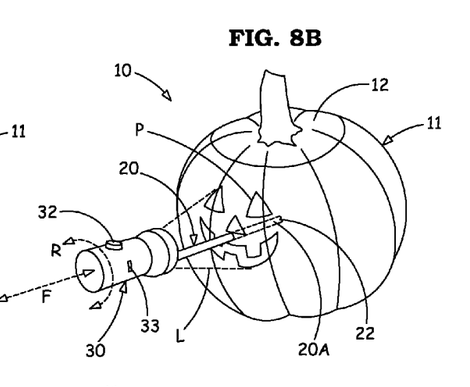
FIG. 8B is a perspective view of the second step of the method of use, specifically showing the user having penetrated the projector positioner through the shell of the object, and then selecting the relative positioning of the projector to the pumpkin for the desired pattern orientation and size, prior to pattern transfer.
Figure 8C:
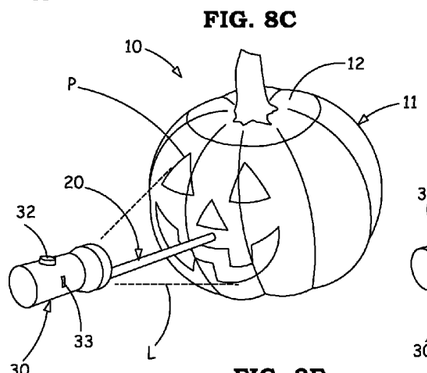
FIG. 8C is a perspective view of the third step of the method of use, specifically showing the selected relative pattern orientation and size by the user, prior to transfer.

The optical design of the projector 30 has specific requirements in order to meet the objectives illustrated in FIG. 8B and FIG. 6C. The projector positioner 20 has a length that is selected considering the optical design of the projector 30. The optical design objective is to provide a specific range of possible projected pattern P sizes. For example, when the distal end of the projector positioner 22 is penetrated minimally through the shell of the object 11 shell, the projected pattern P will be the maximum chosen size, which the user could choose for a large pumpkin, as shown in FIG. 8C. When distal end of the projector positioner 22 is inserted further into the object 11 shell, the projected image P is much smaller, which the user could choose for a small pumpkin, as shown in FIG. 8B. The optical design of the projector 30 is co-designed with the length of the projector positioner 20 to ensure these requirements are met. The optical design of the projector 30 is such that the lens 39 properly projects a focused image at the range of desire projected image pattern P sizes. As shown in FIG. 2, the projector housing 31 is designed to ensure the proper distance between the projection slide 40 and the lens 39. The focal point 37 will be determined by the design of the lens 39 and supported by the design of the projector housing 31. A recessed feature 31A may be included for connection to the proximal end of the projector positioner 21. This is shown in detail in FIG. 3. The lens 39 may be comprised of a multitude of designs to meet the design objectives, and the desired size and configuration of the projector 30. The lens 39 may be any combination of convex and concave designs, including dual convex or concave designs, in order to meet the design objectives. Optical design is well established in the current state of the art. The optical design further ensures that the image projected onto the object is of sufficient quality and sharpness for the user accurately transfer said image to said object. The final configuration is important to the function of the present invention.

Figure 3:
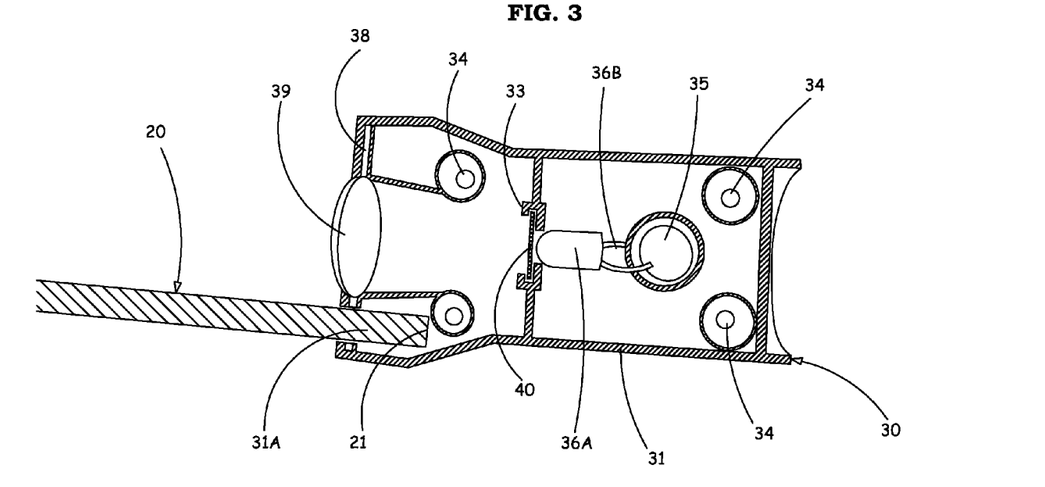
FIG. 3 is a cross-sectional view of the projector, showing the functional elements of the preferred embodiment, including means of connection between the projector and the proximal end of the projector positioner, by means of a properly shaped receptacle in the projector housing matching the opposing geometry of the proximal end of the projector positioner.
Figure 4:
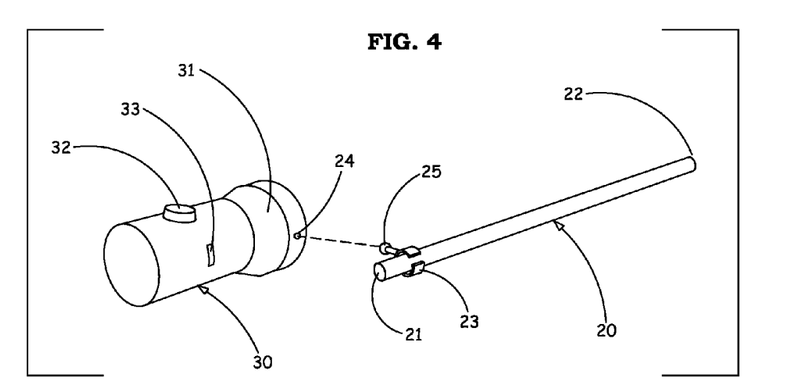
FIG. 4 is a perspective view of the projector showing an alternative means of connection between the projector and the proximal end of the projector positioner, by means of a properly shaped clip with means of connection to the projector housing matching the opposing geometry of the proximal end of the projector positioner.
Figure 5:
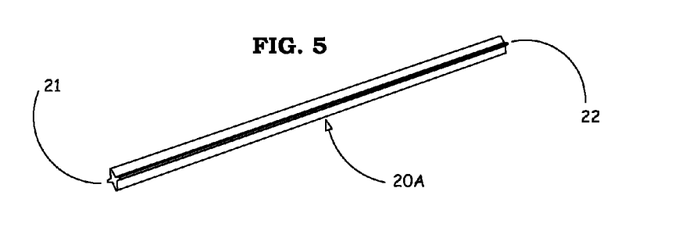
FIG. 5 is a perspective view of an alternative embodiment of the projector positioner, wherein the cross-section is a multi-pronged shape (star).
Figure 6:
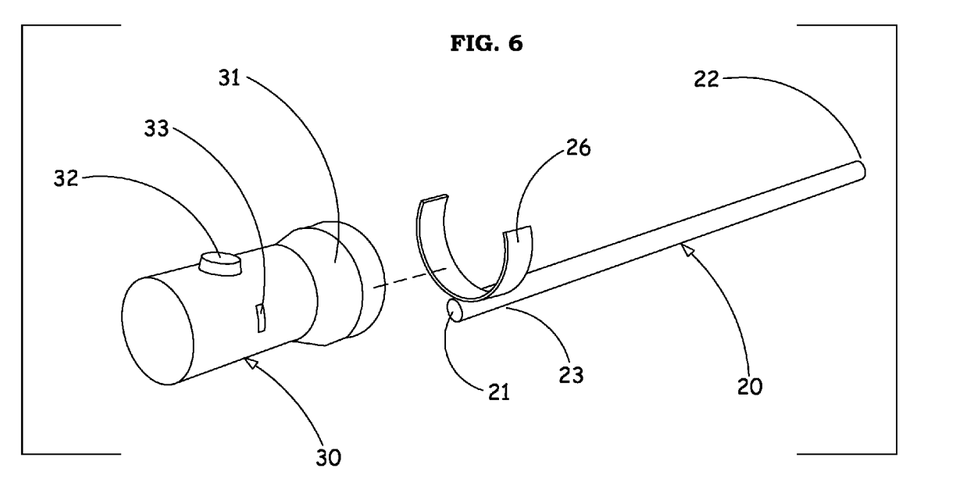
FIG. 6 is a perspective view of the projector showing an alternative means of connection between the projector and the proximal end of the projector positioner, by means of a properly shaped clip, which is integral to the projector positioner, with means of connection to the projector housing matching the opposing geometry of the proximal end of said projector positioner clip.

FIG. 3, FIG. 4, FIG. 5, and FIG. 6 provide examples of connection means between the projector 30 and the projector positioner 20. In one embodiment of the projector 30, as shown in FIG. 3, a receptacle 31A is included in the projector housing 31 that will tightly match the geometry of the proximal end of the projector positioner 21. The projector 30 and projector positioner 20 are connected by inserting the proximal end of the projector positioner 21 into the projector positioner receptacle 31A. The projector positioner receptacle 31A is designed such that the fit is tight, but also allows for relative axial rotation of the projector positioner 20 in the projector positioner receptacle 31A. Additional functionality of the projector positioner receptacle 31A, is that the relative rotational position (non-axial) can be accommodated by the projector positioner 20 within the projector positioner receptacle 31A, which will allow for fine adjustment of the projected image pattern P on the object 11 after the selection of the initial position by the user. In a second embodiment of the projector 30, as shown in FIG. 4, a projector positioner connector 23 is included external to the projector housing 31 that will tightly match the geometry of the projector positioner 20. The projector 30 and projector positioner 20 are connected by inserting the proximal end of the projector positioner 21 into the projector positioner connector 23. The projector positioner connector 23 is designed such that the fit is tight, but also allows for relative axial rotation of the projector positioner connector 23 relative to the projector housing 31. The relative rotational position between the projector positioner connector 23 and the projector housing 31 is easily accomplished through a jointed, or snap-fit connection as shown in FIG. 4. FIG. 4 shows a projector positioner connector post 25 that is inserted into the projector positioner connector receptacle 24 in the projector housing 31. The relative axial rotation allowed by the connection between the projector positioner connector 23 and the projector housing 31 allows for fine adjustment of the projected image pattern P on the object 11 after the selection of the initial position by the user. FIG. 5 shows an alternative embodiment of the projector positioner 20A, wherein the cross-section is non-uniform. The cross-section shown is a 4-pronged shape that will minimize the damage to the object upon penetration. The cross-section can take any shape, and will succeed in matching the intended function, so long aspect ratio is maintained, which is more important to the design. In a third embodiment of the projector 30, as shown in FIG. 6, a projector positioner connector 26 is included external to the projector positioner 20 that will tightly match the geometry of the projector housing 31. The projector 30 and projector positioner 20 are connected connecting the housing 31, to the inside of the projector positioner connector 26. The projector positioner connector 26 is designed such that the fit is tight, but also allows for relative axial rotation of the projector positioner connector 26 relative to the projector housing 31. The relative rotational position between the projector positioner connector 26 and the projector housing 31 is easily accomplished through typical capabilities of the state of the art. The relative axial rotation allowed by the connection between the projector positioner connector 26 and the projector housing 31 allows for fine adjustment of the projected image pattern P on the object 11 after the selection of the initial position by the user.

Figure 7:
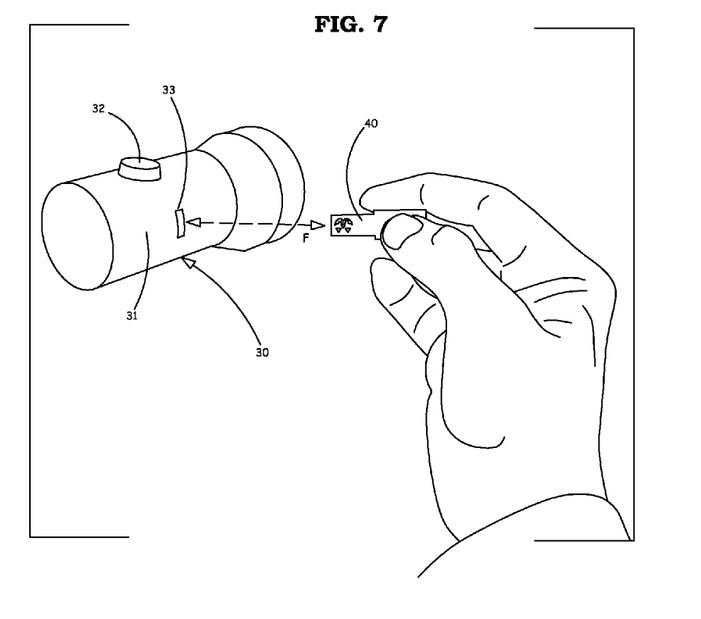
FIG. 7 is a perspective view illustrating the selection and installation of the projection pattern by the user through a provided opening in the projector housing, which guides and supports the projection slide to the proper functional location inside the projector.

The present invention allows the user to easily select and insert or replace a projection slide 40 into, or away from, the projector 30 by means of a projection slide slot 33. FIG. 7 illustrates how the user accomplishes the insertion or removal of the projection slide 40 into or out of the projection slide slot 33, by providing a force F. The projection slide slot 33 is designed into the projector housing 31, as shown in FIG. 2, to guide the projection slide 40 into the proper position in order to ensure proper optical performance of the projector 30, while also holding the projection slide 40 in a temporary and stable position. The projection slide 40 appears upside down, as shown in FIG. 7, due to the optical function of the projector. This is well understood in field of optics.

Figure 8D:
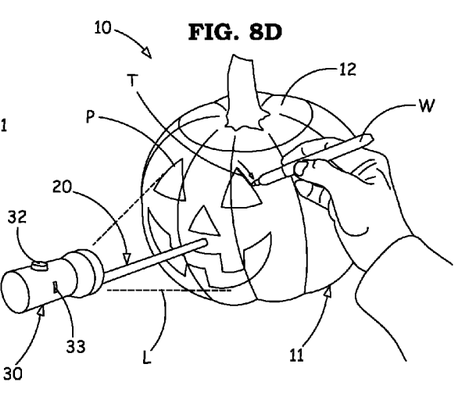
FIG. 8D is a perspective view of the fourth step of the method of use, specifically showing the transfer of the projected image to the object by tracing said pattern using a common ink pen.
Figure 8E:
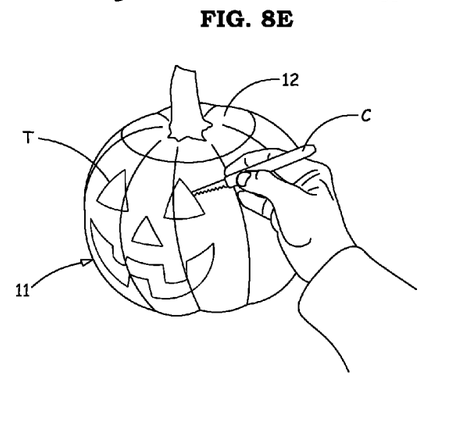
FIG. 8E is a perspective view of the fifth step of the method of use, specifically showing the user carving along the transferred pattern using a common carving tool after removal of the projector and projector positioner.
Figure 8F:
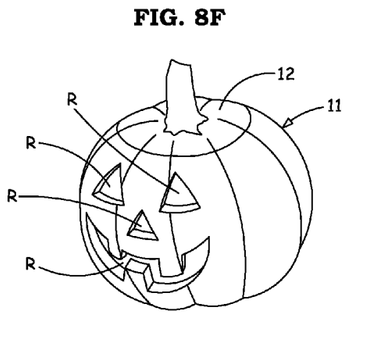
FIG. 8F is a perspective view of the sixth step of the method of use, specifically showing the final carved object after removal of the carved sections by the user.

The present invention includes a method for the use of the provided apparatus for the preferred embodiment as shown in FIG. 8A, FIG. 8B, FIG. 8C, FIG. 8D, FIG. 8E, and FIG. 8F. The first step of the method is illustrated in FIG. 8A. The user begins use of the present invention 10 by preparation of an object 11 as shown in FIG. 1. The user then selects and installs a projection slide 40 into the projection slide slot 33, as shown in FIG. 7. The projector 30 is connected to the proximal end of the projector positioner 21, through the application of a force F, as previously described in this disclosure. The user then actuates the switch 32, then selects the desired general location of the projection image P and penetrates the distal end of the projector positioner 22 through the shell of the object 11, as shown in FIG. 8B. The hidden portion of the projector position 20A is shown as a dashed line in FIG. 8B. The user then selects the size and orientation of the projected image P by choosing the relative distance between the object 11 and the projector 30 by controlling the distance the projector positioner 20 is inserted into the object 11, which is accomplished by applying a linear axial force F, as indicated. The user can further control the orientation of the projected image P by adjusting the relative axial rotation R between the projector 30 and the object 11. Final adjustment of projection image P location can be accommodated by adjusting the angle (non-axial) between the projector 30 and the projector positioner 20 as previously disclosed, and as varies depending upon the embodiment chosen. Once the final position of the projection image P is chosen, as shown in FIG. 8C, the user creates a transferred pattern T of the projection image P by any number of means. The means of transfer can be accomplished, for example, by tracing the projection image P boundaries with a writing device W, as shown in FIG. 8D. Other means of transfer are discussed in the current state of the art, but are not limited to the means shown. Once the projection image P is fully transferred to the object as a transferred pattern T by the chosen means, the user removes the projector 30 and projector positioner 20, and carves the object 11 along the lines of the transferred pattern T with a carving utensil C, as shown in FIG. 8E. Finally, the user removes carved sections R created in the object 11 to complete the object 11, as shown in FIG. 8F.

The spirit of the present invention provides a breadth of scope that includes all methods of transfer of a projected pattern onto an object by using common means of transfer, including those of the state of the art. Any variation on the theme and methodology of accomplishing the same that are described herein would be considered under the scope of the present invention.

The present invention has been described in detail specific to the preferred embodiments. The following claims allow for modifications and changes to the preferred embodiments of the present invention. The inventor of the present invention was in possession of the invention at the date of filing.

What is claimed is:

1. An apparatus for the transfer of patterns to an object, wherein said object having an enclosed volumetric form, and outer shell of varying thickness, comprising: a. a projector for the projection of a projected image onto said object, wherein said projector comprising a housing, a power source, a light source, a switch, a projection slide, and a lens; b. a projector positioner having an elongated form having thin width as compared to its length, wherein: i. said projector positioner having a proximal end and a distal end; ii. said proximal end having a connection to said projector; iii. wherein said distal end is penetrated through said outer shell of said object creating a temporary and stable relative position between said object and said projector; c. wherein said housing providing structure and enclosure of said power source, said light source, said switch, and said lens; d. wherein said projection slide comprising an image to be projected onto the surface of said object; e. wherein said switch is actuated, thereby connecting said power source to said light source, which projects light across said projection slide, and through said lens, which terminates on said object as said projected image; f. wherein the user transfers said projected image to said object with a writing utensil; g. wherein the user transfers said projected image to said object with a carving utensil.

2. An apparatus for the transfer of patterns to an object, wherein said object having an enclosed volumetric form, and outer shell of varying thickness, comprising: a. a projector for the projection of a projected image onto said object, wherein said projector projects an image onto said object; b. a projector positioner having an elongated form having thin width as compared to its length, wherein: i. said projector positioner having a proximal end and a distal end; ii. said proximal end having a connection to said projector; iii. wherein said distal end is penetrated through said outer shell of said object creating a temporary and stable relative position between said object and said projector; c. wherein the user transfers said projected image to said object with a writing utensil; d. wherein the user transfers said projected image to said object with a carving utensil.

3. A method for the transfer of patterns to an object, comprising: a. providing said object having an enclosed volumetric form, an outer shell of varying thickness; b. providing an apparatus for the transfer of patterns to said object comprising; i. a projector for the projection of a projected image onto said object, wherein said projector projects an image onto said object; ii. a projector positioner having an elongated form having thin width as compared to its length, wherein: 1. said projector positioner having a proximal end and a distal end; 2. said proximal end having a connection to said projector; 3. wherein said distal end is penetrated through said outer shell of said object creating a temporary and stable relative position between said object and said projector; c. securing said proximal end of said projector positioner to said projector; d. penetrating said distal end of said projector positioner through said outer shell of said object, creating a temporary and stable relative position between said projector and said object; e. activating said projector, wherein said projected image is projected onto said outer shell of said object; f. transferring said projected image to said object with a writing utensil; g. transferring said projected image to said object with a carving utensil.

* * * * *